United States Patent Office 3,415,900
Patented Dec. 10, 1968

3,415,900
CROSS LINKING HYDROFLUORINATED OLEFIN POLYMERS AND SILICONE RUBBERS AND RESULTANT CROSS LINKED COMPOSITIONS
Lester E. Robb, Wayne, Pa., assignor to Minnesota Mining and Manufacturing Company, St. Paul, Minn., a corporation of Delaware
No Drawing. Continuation of application Ser. No. 757,109, Aug. 25, 1958, which is a continuation-in-part of application Ser. No. 609,518, Sept. 13, 1956. This application Jan. 10, 1964, Ser. No. 336,858
20 Claims. (Cl. 260—827)

This application is a continuation-in-part of United States Patent Ser. No. 609,518, filed Sept. 13, 1956, now abandoned and a continuation of U.S. Ser. No. 757,109, filed Aug. 25, 1958, now abandoned.

This invention relates to cross-linked compositions. In one aspect this invention relates to new polymeric compositions and to the method for the preparation thereof. In another aspect this invention relates to the cross-linking of linear polymers. In another aspect this invention relates to the modification of the characteristics of chain saturated polymers containing halogen substituents on the carbon atoms. In still another aspect this invention relates to cross-linking of fluorinated elastomers.

Chlorofluorinated elastomers are used when highly chemical resistant and electrical insulation properties are desired. The chlorofluorinated elastomers of chlorotrifluoroethylene and vinylidene fluoride, in addition to the above desirable characteristics, also have good hardness and excellent elongation properties; however, they are unsuitable in certain applications requiring high temperature stability and/or low temperature flexibility. At temperatures below about −15° C. the chlorotrifluoroethylene-vinylidene fluoride elastomer shows a loss in flexibility.

In applications where rubbers are useful, industry has demanded within recent years faster operation and the development of more power. This has resulted at times in temperatures too high for the economical use of natural rubber. Activities in the Arctic regions and the development of planes that fly in the stratosphere have called for operation of machinery at temperatures well below those at which natural rubber will retain its useful characteristics. The presence of ozone, resulting from high voltage applications, quickly deteriorates natural rubber and most other organic rubbers. Although chlorotrifluoroethylene-vinylidene fluoride is resistant to attack by ozone and almost all other chemical reagents, it becomes brittle at temperatures below about −50° C. and becomes tacky at temperatures of 230° C. and above.

A rubber which possesses high chemical resistance, good low temperature flexibility and/or improved high temperature stability would have wide application and would meet the current needs of industry where rubber and elastomeric polymers are indispensable material.

It is, therefore, an object of this invention to provide a new and improved cross-linked rubbery composition.

Another object of this invention is to provide a method for preparing a new and useful elastomeric composition having improved properties.

Another object of this invention is to provide a cross-linked polymeric composition having high heat resistance and excellent chemical resistance to acids, bases and other chemical reagents.

Another object is to provide a cross-linked halogenated polymer having good low temperature flexibility.

Another object is to provide a cross-linked highly halogenated polymer having high temperature stability.

Another object of this invention is to provide a cross-linked chlorotrifluoroethylene-vinylidene fluoride polymer having improved properties.

A further object is to provide a process for the preparation of a novel vulcanizing admixture which process is readily controlled to yield a cross-linked polymer having the desired characteristics.

Other objects and advantages of the present invention will become apparent to those skilled in the art from the accompanying description and disclosure.

According to this invention a silicone rubber is reacted with a hydrofluorinated polymer in the presence of a peroxy catalyst to produce a cross-linked polymer of improved properties.

The hydrofluorinated polymers which are used in accordance with the present invention are linear fluorinated polymers having at least half of their hydrogen atoms substituted with normally gaseous halogen atoms, i.e., chlorine and/or fluorine. These hydrohalogenated polymers include the copolymers of perfluoropropene and vinylidene fluoride and copolymers having the following general formula:

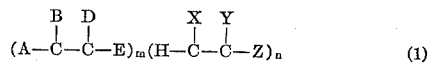

(1)

wherein C is a carbon atom; A, B, D, E and Z are each normally gaseous halogen atoms which are independently selected from the group consisting of chlorine and fluorine atoms and of the units A, B, D and E at least two are fluorine atoms; X and Y are each selected from the group consisting of hydrogen, chlorine and fluorine atoms; m and n are each integers from 1 to 10,000. It is to be understood that the units CAB–CDE and CHX–CYZ can occur in an alternate or successively recurring manner along the polymer chain.

Of the abovementioned polymers, chlorotrifluoroethylene-vinylidene fluoride elastomer is preferred. The preferred proportions of these monomers for rubbery characteristics ranges from about 20 to 70 mole percent of chlorotrifluoroethylene. However, chlorotrifluoroethylene-vinylidene fluoride resins containing between about 70 and about 85 mole percent chlorotrifluoroethylene may also be used without departing from the scope of this invention.

Other hydrofluorinated polymers which are suitably used in accordance with the present invention include tetrafluoroethylene-vinylidene fluoride, tetrafluoroethylene - 1 - chloro - 1 - fluoroethylene, tetrafluoroethylene-trifluoroethylene, chlorotrifluoroethylene - 1 - chloro - 1 - fluoroethylene, chlorotrifluoroethylene - vinyl fluoride, chlorotrifluoroethylene - trifluoroethylene, symdifluorodichloroethylene - vinylidene fluoride, asym - difluorodichloroethylene - vinylidene fluoride copolymers and any other copolymer combinations of the monomers and co-monomers mentioned above. Still another hydrofluorinated polymer which is suitably used in accordance with this invention is the copolymer of perfluoropropene and vinylidene fluoride (1 to 60 mole percent of perfluoropropene), preferably the elastomeric copolymer of perfluoropropene and vinylidene fluoride (15 to 60 mole percent of perfluoropropene).

The silicone polymers of this invention are silicone rubbers having siloxane bondings

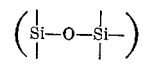

These rubbers have a molecular weight of between about 2,500 and about 3,000,000 and possess the general properties shown in Table I.

TABLE I

Hardness:
- Durometer "A"—Shore Hardness _____ 40–90
- Tear strength—pounds per inch _____ 30–75
- Percent elongation (minute) _____ 70–250
- Tensile strength, p.s.i.g. _____ 400–1000

Of the various types of silicone rubbers which may be used in accordance with the present invention, dimethyl siloxane, phenylmethyl siloxane and phenyl methyl vinyl siloxane rubbers are preferred and of these, dimethyl siloxane rubber is most preferred. The dimethyl siloxane elastomer may have some of its methyl groups substituted with phenyl and/or vinyl groups. Usually the dimethyl siloxane rubber contains between about 5 and about 10 percent by weight of phenyl radicals based on the total polymer.

The silicone rubbers of this invention correspond to the following general formula:

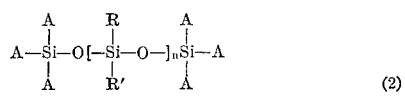

$$\text{(2)}$$

wherein R and R' are organic radicals and are each selected from the group consisting of alkyl radicals containing not more than 5, preferably not more than 3 carbon atoms; alkenyl radicals containing not more than 5, preferably not more than 3 carbon atoms; phenyl radicals and any of the halo-substituted derivatives of the foregoing radicals; each A is selected from the group consisting of the aforementioned radicals and hydrogen, and $n$ is an integer from about 1,000 to about 200,000. It is preferred that in the silicon rubber of formula (2) less than half of the organic radicals are phenyl radicals or alkenyl radicals.

Examples of silicone rubbers which are suitably used in the vulcanization process of this invention, in addition to the preferred types specifically mentioned above, are methyl ethyl siloxane, methyl propyl siloxane, ethyl phenyl siloxane and chlorinated dimethyl siloxane polymers such as, for example, Viscasil (methyl silicones having a viscosity range of 25° C. of from 5,000 to 100,000 centistokes).

According to the process of this invention, the silicone rubber which is to be cross-linked or covulcanized with the hydrofluorinated polymer, is treated initially to improve its tensile strength before admixing with the hydrofluorinated copolymer. This treatment comprises impregnating the rubber with between about 20 and about 50 parts by weight of silica per 100 parts by weight of rubber.

The silica impregnant or filler may be added as synthetically prepared fine particles, such as Syton-200, as diatomaceous earth, as a precipitated silica such as Hisil-303, as silicon tetrachloride which has been treated in an oxidizing flame (e.g. Cabotsil), as a Clay silicate such as magnesium aluminum silicate and as zirconium silicate.

Additional amounts of silica may be incorporated subsequently into the vulcanizable admixture when compounding the treated silicone rubber and the hydrofluorinated polymer together on a mill.

Generally, the ratio of hydrofluorinated polymer to treated silicone polymer employed in the covulcanization process of this invention varies between about 10:90 and about 95:5 parts by weight and preferably between about 40:60 and about 90:10 parts by weight.

The vulcanization reaction of the present invention is initiated by the addition of a peroxy catalyst such as benzoyl peroxide, acetyl peroxide, trichloroacetyl peroxide, di-tert-butyl peroxide, tert-butylperbenzoate, 2,4-dichlorobenzoyl peroxide, difluorochloroacetyl peroxide and chloroacetyl peroxide catalysts. The catalyst, which initiates the formation of free radicals, is added to the polymeric mixture in amounts varying between about 1 and about 10 parts by weight per 100 parts by weight of total polymer.

The addition of accelerators to the above described vulcanization recipes is not essential for the preparation of the cross-linked polymer. It is, however, desirable in most cases to add oxides of a weakly basic nature such as zinc oxide, lead oxide, cadmium oxide, calcium oxide or a lead oxide-lead phosphite mixture or any combination of the foregoing oxides. Of the abovementioned accelerators, a mixture of zinc oxide and lead oxide phosphite is most preferred. The accelerator is added to the vulcanization recipe in an amount between about 5 and about 50 parts by weight, preferably between about 10 and about 30 parts by weight per 100 parts by weight of total polymer.

Fillers are often added to the polymeric mixture to improve the molding characteristics, however, they are not necessary, nor do they benefit the covulcanization and curing processes of the present invention. When a filler is employed it is added to the vulcanization recipe in an amount between about 5 and about 50 parts by weight, preferably between about 10 and about 40 parts by weight per 100 parts by weight of total polymers.

Examples of fillers which are suitably but not necessarily employed in the covulcanizable recipe are any of the previously mentioned forms of silica which are used for pretreating silicone rubber; calcium carbonate when the end-use of the vulcanizate is a coating paste or adhesive; alumina; and red iron oxide which provides good heat aging characteristics and is used when other fillers are employed which deleteriously affect heat aging.

In accordance with this invention, the desired amount of hydrofluorinated polymer, silicone rubber, peroxide catalyst, metal oxide accelerator and any of the other additives which are desired are intimately mixed or compounded by employing any of the usual rubber mixing devices such as, for example, a Banbury mixer, a roll mill, or any other convenient mixing device. It has been found that a two-roll rubber mill employed with cored chambers is particularly suitable for this purpose.

The mixture is compounded on the mill at a temperature between about 50° F. and about 210° F., preferably between about 100° F. and about 200° F. At temperatures above 210° F. the crosslinking becomes very rapid and a substantial amount of covulcanization is likely to occur on the mill before it is desirable to effect a cure.

The milling process is carried out for a period of from about 15 minutes to several days depending upon the amount of material to be milled.

In the subsequent curing process, the catalyst becomes activated and transfers this activation to the polymer chains which results in the abstraction of hydrogen atoms from the chains by the catalyst. The active chain sites terminate to form bonds or cross-links and the catalyst residue is removed, for example, by vaporization.

The compounded mixture so prepared can be cured immediately or can be stored for a few days and then cured. The curing process comprises pressing the compound mixture at a temperature between about 200° F. and about 350° F. for a period of from 15 minutes to 5 hours to obtain a mold and then baking the mold in an oven at a temperature between about 250° F. and about 450° F. for a period of from 1 hour to 24 hours. The pressing of the compounded mixture is preferably carried out at a temperature of between about 225° F. and about 250° F. for a period of from 15 minutes to 1 hour and the baking is preferably carried out at a temperature of about 300° F. for a period of from 12 to 18 hours. The molds may be coated with a silicone emulsion or a silicone oil, and prebaked for about 4 hours at about 500° F. This coating step may be omitted if desired, however, in some cases the vulcanizate has shown better release properties when employing this additional step. A pressure of between about 100 and about 2,000, preferably between about 500 and about 1,000 pounds per square inch gauge is imposed on the compounded mixture in the mold.

The vulcanization or covulcanization process of the present invention results in the production of a covulcanized product containing the cross-links as shown in the equation below:

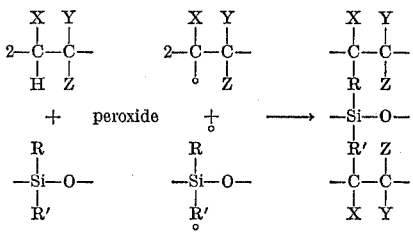

wherein the substituents correspond to those defined in Formulae 1 and 2.

The cross-linking or covulcanization occurs at any point on the hydrofluorinated polymeric chain where a carbon atom is bonded to a hydrogen atom and on the silicone chain through the organic radicals described as R and R'. As illustrated above, a hydrogen atom of the hydrofluorinated polymeric chain and a hydrogen atom of the R radical bonded to silicon are removed by the catalyst when the polymers cross-link.

When the organic radical of a silicone rubber is a methyl group, as in dimethyl siloxane, a free radical is formed in the presence of a peroxy catalyst and the cross-linking radical bonded to silicon is a methylene radical. When the organic radical is a phenyl group as in a methyl phenyl siloxane, the free radical formed in the presence of a peroxy catalyst is a phenylene radical. For example, the chlorotrifluoroethylene-vinylidene fluoride copolymer is cross-linked, by the formation of a free radical at the position of one of the hydrogen atoms to a dimethylene siloxane radical or to a phenylene methylene siloxane radical.

The preferred product of this invention is an elastomer comprising a chlorotrifluoroethylene-vinylidene fluoride copolymer chain cross-linked by a dimethyl siloxane polymer.

The vulcanizate produced in the covulcanization process of this invention is one which heretofore has been unattainable in spite of many attempts for its preparation by different methods. The incompatible nature of chlorotrifluoroethylene-vinylidene fluoride toward silicone rubbers will be appreciated by those skilled in the art. Nevertheless, a highly cross-linked chlorotrifluoroethylene-vinylidene fluoride silicone rubber polymer of improved properties is produced by the process of this invention.

The vulcanizate has high tear strength, about 200 pounds per square inch or higher, high temperature stability up to about 400° F. or higher and shows no deleterious affect upon aging, good low temperature flexibility, elongation of between 450 and 800 percent and possesses excellent chemical resistance to oils, ozone, acids, alkalies and many chemical reagents.

The following examples are offered as a better understanding of the present invention and are not to be construed as unnecessarily limiting thereto.

EXAMPLE I

The following recipe was compounded on a two-roll rubber mill at 120° F.

Ingredients: Parts by weight
30% Chlorotrifluoroethylene - 70% vinylidene fluoride copolymer _____ 90
Silicone rubber (polymerized dimethyl siloxane with an average viscosity of 15,000 cp. at 25° C. in a 35% solids solution in xylene) _____ 10
Zinc oxide _____ 10
Diphos (2PbO.PbHPO₃) _____ 10
Benzoyl peroxide _____ 3

The compounded mixture was then placed in a mold and pressed for one-half hour at 230° F. under a pressure of 700 pounds per square inch gauge. The mold was then baked in an oven for 16 hours at 300° F. The product obtained was chemically resistant to oils, acids and other chemical reagents, displayed good temperature stability and good low temperature flexibility. The molded sheet possessed a tensile strength of 1,500 pounds per square inch gauge, a percent elongation of 400 and a tear strength of 130 pounds per inch.

EXAMPLE II

The following recipe was compounded on a two-roll rubber mill at 150° F. Silicone rubber SE–550 was treated wilh silicone coated Hisil-C (20 parts by weight) before compounding with chlorotrifluoroethylene-vinylidene fluoride elastomer.

Ingredients: Parts by weight
30% Chlorotrifluoroethylene-70% vinylidene fluoride copolymer _____ 50
Silicon rubber (polymerized dimethyl siloxane with an average viscosity of 15,000 c.p. at 25° C. in a 35% solids solution in xylene, compounded with silica) _____ 50
Zinc oxide _____ 10
Diphos _____ 10
Benzoyl peroxide _____ 3

The compounded mixture was placed in a mold for one-half hour at 230° F. under a pressure of 600 pounds per square inch gauge. The pressed sample was then placed in an oven and baked for 16 hours at 300° F. The product had a smooth bubble-free surface having a tensile strength in pounds per square inch gauge of 1550; percent elongation 450; Shore Hardness "A" 66; and Gehman stiffness of $T_2$ at $-3°$ C., $T_5$ at $-8°$ C., $T_{10}$ at $-14°$ C. and $T_{100}$ at $-45°$ C. The product has better tensile properties, tear strength, flame resistance and chemical resistance than silicone rubber alone and has better low temperature properties than those exhibited by chlorotrifluoroethylene-vinylidene fluoride elastomer alone.

Any of the other hydrofluorinated copolymers and silicon rubbers previously mentioned can be covulcanized in a manner similar to that set forth above and can be substituted in either of the examples without departing from the scope of this invention.

The vulcanizates of this invention are usefully employed as molded or extruded articles of manufacture and are especially valuable in applications requiring high temperature stability and low temperature flexibility, such as in the molding of gaskets, o-rings, diaphragms, tubing, etc. The chlorotrifluoroethylene-vinylidene fluoride-silicone rubber vulcanizates are suitable in applications requiring high chemical resistance, such as conditions encountered in fabricating molded articles in aircraft, heat exchangers and others. The vulancizable admixture can be applied as a paste or solvent dispersion to a substrate for the purpose of coating fabrics, wires, glass and the like and cured thereon. Laminated vulcanizates or molded, laminated vulcanizates are useful as aircraft gaskets and seals. When applied to a fabric and then cured the vulcanizate provides a nonstick water repellent chemically resistant coating. Vulcanizates can also be pressed into sheets or films as protective coverings or mats to prevent chemical corrosion.

The present invention relates to the novel vulcanizate namely chlorotrifluoroethylene-vinylidene fluoride-silicone rubber vulcanizate and other hydrofluorinated elastomers and silicone rubber vulcanizates and to the method of effecting their covulcanization in the presence of a peroxy catalyst which may be any of the various modifications and alternatives of the procedure set forth herein and may become apparent to those skilled in the art without departing from the scope of this invention.

I claim:
1. An elastomeric material comprising from about 5 to about 90 parts by weight of (1) a silicone rubber having a tensile strength between about 400 and about 1000 pounds per square inch gauge, and a formula

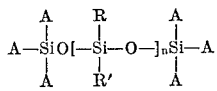

wherein R and R' are selected from the group consisting of alkyl radicals having not more than 5 carbon atoms, alkenyl radicals having not more than 5 carbon atoms, phenyl radicals and the halogenated derivatives thereof, A is hydrogen or one of the aforementioned radicals, and $n$ is an integer from about 1,000 to about 200,000, cross-linked to from about 10 to 95 parts by weight of (2) a linear normally solid, fluorinated copolymer having both hydrogen and halogen substituents, at least half of said substituents being halogen atoms selected from the group consisting of chlorine and fluorine, said copolymer being either a copolymer of perfluoropropene and vinylidene fluoride or a copolymer having the formula:

$$(A-\overset{B}{\underset{|}{C}}-\overset{D}{\underset{|}{C}}-E)_m(H-\overset{X}{\underset{|}{C}}-\overset{Y}{\underset{|}{C}}-Z)_n$$

wherein A, B, D, E and Z are selected from the group consisting of chlorine and fluorine, at least two of A, B, D and E being fluorine, X and Y are selected from the group consisting of hydrogen, chlorine and fluorine, and $m$ and $n$ being integers from 1 to 10,000, said cross-linkage having the formula

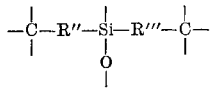

where R'' and R''' are selected from the group consisting of alkylene radicals with not more than 5 carbon atoms, alkenylene radicals having not more than 5 carbon atoms, phenylene radicals, and the halogenated derivatives thereof.

2. The elastomeric material of claim 1 in which the fluorinated polymer is a copolymer of chlorotrifluorethylene and vinylidene fluoride.

3. The elastomeric material of claim 1 in which the fluorinated polymer is a copolymer of tetrafluoroethylene and 1-chloro-1-fluoroethylene.

4. The elastomeric material of claim 1 in which the fluorinated polymer is a copolymer of chlorotrifluoroethylene and vinyl fluoride.

5. The elastomeric material of claim 1 in which the fluorinated polymer is a copolymer of chlorotrifluoroethylene and 1-chloro-1-fluoroethylene.

6. The elastomeric material of claim 1 in which the fluorinated polymer is a copolymer of sym-difluorodichloroethylene and vinylidene fluoride.

7. The elastomeric material of claim 1 in which the fluorinated polymer is a copolymer of perfluoropropene and vinylidene fluoride.

8. A crosslinking process which comprises reacting from about 5 to about 90 parts by weight of (1) a silicone rubber having a tensile strength between about 400 and about 1000 pounds per square inch gauge and a formula

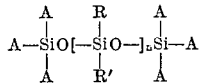

wherein R and R' are selected from the group consisting of alkyl radicals having not more than 5 carbon atoms, alkenyl radicals having not more than 5 carbon atoms, phenyl radicals and the halogenated derivatives thereof, A is hydrogen or one of the aforesaid radicals, and $n$ is an integer from about 1,000 to about 200,000, and from about 10 to about 95 parts by weight of a normally solid, linear fluorinated copolymer having both hydrogen and halogen substituents, at least half of said substituents being halogen atoms selected from the group consisting of chlorine and fluorine, said copolymer being either a copolymer of perfluoropropene and vinylidene fluoride or a coupolymer having the formula:

$$(A-\overset{B}{\underset{|}{C}}-\overset{D}{\underset{|}{C}}-E)_m(H-\overset{X}{\underset{|}{C}}-\overset{Y}{\underset{|}{C}}-Z)_n$$

wherein A, B, D, E and Z are selected from the group consisting of chlorine and fluorine, at least two of A, B, D and E being fluorine, X and Y are selected from the group consisting of hydrogen, chlorine and fluorine, and $m$ and $n$ being integers from 1 to 10,000, in the presence of a peroxy vulcanization catalyst which initiates the formation of free radicals.

9. The process of claim 8 in which said reaction is carried out at a temperature between about 200° F. and about 450° F.

10. The process of claim 8 in which the fluorinated polymer is chlorotrifluoroethylene-vinylidene fluoride copolymer.

11. The process of claim 8 in which the fluorinated polymer is a copolymer of tetrafluoroethylene and 1-chloro-1-fluoroethylene.

12. The process of claim 8 in which the fluorinated polymer is a copolymer of chlorotrifluoroethylene and vinyl fluoride.

13. The process of claim 8 in which the fluorinated polymer is a copolymer of chlorotrifluoroethylene and 1-chloro-1-fluoroethylene.

14. The process of claim 8 in which the fluorinated polymer is a copolymer of sym-difluorodichloroethylene and vinylidene fluoride.

15. The process of claim 8 in which the fluorinated polymer is a copolymer of perfluoropropene and vinylidene fluoride.

16. The process of claim 8 in which the silicone rubber is dimethylsiloxane polymer.

17. The process of claim 8 in which the silicone rubber is diethylsiloxane polymer.

18. The process of claim 8 in which the silicone rubber is methylphenylsiloxane polymer.

19. The process of claim 8 in which the silicone rubber is a siloxane polymer containing methyl, phenyl and vinyl groups.

20. The process of claim 8 in which the silicone rubber is a chlorinated dimethyl siloxane.

References Cited

UNITED STATES PATENTS

| | | | |
|---|---|---|---|
| 2,820,772 | 1/1958 | Barnhart | 260—33.8 |
| 2,877,207 | 3/1959 | Cox et al. | 260—827 |
| 2,909,548 | 10/1959 | Bailey et al. | 260—827 |
| 2,958,707 | 11/1960 | Warrick | 260—827 |
| 3,069,378 | 12/1962 | Prober | 260—827 |

FOREIGN PATENTS 754,164   8/1956   Great Britain.

SAMUEL H. BLECH, *Primary Examiner.*

U.S. Cl. X.R.

260—41; 117—161, 124, 135.5